3,446,654
Patented May 27, 1969

3,446,654
STRUCTURAL ELEMENTS COMPRISING ADHERENT THERMOPLASTIC POLYARYLENE POLYETHER AND AN ADHEREND AND METHOD FOR MAKING THE SAME
Bruce P. Barth, Bound Brook, and Edward G. Hendricks, Belle Mead, N.J., assignors to Union Carbide Corporation, a corporation of New York
No Drawing. Filed Nov. 12, 1964, Ser. No. 410,778
Int. Cl. C03c 25/02; B44d 1/36; C04b 41/00
U.S. Cl. 117—123                                20 Claims

ABSTRACT OF THE DISCLOSURE

Structural elements of an adherend and adhering thereto a linear thermoplastic polyarylene polyether of the —O—E—O—E'— type. Adherends include metals, vitreous materials, nonmetallic materials and resins among others.

---

This invention relates to structural elements comprising virtually universally adherent thermoplastic polyarylene polyethers having high temperature characteristics heretofore unavaliable in thermoplastic material and particularly to structural elements utilizing such poylmers in one or more of decorative, protective, structural or bonding capacities and to methods for making such structural elements. Even more particularly, the invention relates to such structural elements combining the excellent bonding properties normally attributed only to thermosetting materials and the characteristic application versatility of thermoplastic materials but without the notoriously poor thermal and dimensional stability of thermoplastic materials at elevated temperatures. The invention further relates to specific structural laminates comprising an adherend and these adherent polymers and method of making the same.

Means of modifying known materials to adapt them to new uses and new environments are the subject of an unending search. Very often the means discovered is the combination of two or more materials in a manner enabling the obtaining from each material the maximum effect of desirable properties and the minimum effect of the undesirable properties. For example, if a material is inexpensive and strong but has an unattractive surface, it is provided with a decorative coating e.g. a veneer of more beautiful and costlier material; if a material of adequate strength is prone to deterioration upon exposure to its usual use environment, it is provided with a protective coating; if a material lacks sufficient strength for some structural (load-bearing) use it is bonded to one more or other materials until the desired strength is obtained in the plural ply structural element; and if the material lacks adhesiveness to that substrate, it is coated at least in part with a material which adheres to it and the substrate.

The above methods for maximum utilization of properties of known materials each involve the obtaining of an adequate strength adhesive bond at the surface of the material. One widely used method of obtaining such bonds is through the use of thermosetting resins. These resins, notably phenolic resins and epoxy resins, find their chief advantage in their capacity to develop bonds of great strength with numerous substrates and thus facilitate the obtaining of each of the above beneficial modifications. Another advantage of thermosetting resins is their characteristic resistance to creep under long term stress. This is significant where the bond is to be used to bear structural loads for an indefinite period.

Thermosetting resins have been employed heretofore where high bond strength and good creep resistance were prime considerations despite their costliness and the inconvenience of handling them, because there simply was not available any more easily handled material capable of equalling thermosetting resins in these properties.

Thermoplastic resins which form adhesive films, for example polyvinyl acetate, have found little, if any, utility in applications where great bond strength and low creep is required because they have heretofore been unable to deliver both these properties.

Moreover, thermoplastic resins which from adhesive films are not suitable in adhesive applications where the bond is exposed to a wide range of temperatures in normal use and especially where the bond is exposed to elevated temperatures. The reason for this is the notoriously poor thermal and dimensional stability of thermoplastic materials at elevated temperatures.

The potential advantages of an adherent thermoplastic material over commonly used thermosetting materials include both process and product improvements. Process improvement would be obtained because by their nature thermoplastic resins are quite easily and conveniently shaped and applied, and unlike thermosetting resins, the thermoplastic resins have a practically unlimited shelf life, are usable without mixing of components, require no cure and hence obviate costly cure cycles, and contain no volatiles to mar the finished bond. The ultimate convenience in adhesive materials is, of course, a self-sustaining film and thermoplastics are readily film-forming. Product improvement would be obtained because by their nature thermoplastic resins are less brittle, more flexible and more easily variously colored than many known themosetting resins and can be repeatedly softened for further processing or rectifying of assembling errors.

It is, therefore, an object of the present invention to provide structural elements and laminates comprising a virtually universally adherent thermoplastic polyarylene polyether which provides benefits of both thermosetting resins and thermoplastic resins but which eliminates the drawbacks heretofore met with thermosetting and thermoplastic resins.

It is another object to provide structural elements and laminates of thermoplastic polyarylene polyether having bonding strengths, creep resistance and high temperature characteristics equal to thermosetting resins.

It is another object to provide structural elements wherein this virtually universally adherent thermoplastic polyarylene polyether is employed in one or more decorative, protective, structural or bonding capacities.

It has now been discovered that thermoplastic polyarylene polyethers exhibit the bonding strength, creep resistance, high temperature characteristics and the virtually universal adherence of thermosetting resins, and that structural elements comprising thermoplastic polyarylene polyethers bonded to an adherend far exceed in their bond strength, creep resistance and high temperature characteristics heretofore known structural elements comprising adherends and other thermoplastic resins. Thermoplastic polyarylene polyether bonds in fact, approximate and can even exceed in strength and creep resistance, bonds secured using thermosetting resins.

The adherent thermoplastic polyarylene polyethers used in the present invention are the linear thermoplastic polymers having a basic structure composed of recurring units having the formula:

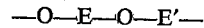

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are referred to in this manner as the polymer is conveniently made by the reaction of an alkali metal double salt of a dihydric phenol and a dihalobenzenoid compound having the electron withdrawing group by techniques as described herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenyl ethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl

sulfide (—S—), sulfone

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols were the hydroxyphenyl groups are bound to the same or different carbon atoms of an organic linking group.

Such dinuclear phenols can be characterized as having the structure

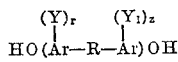

wherein Ar is an aromatic group and preferably is a phenylene group, Y and $Y_1$ can be the same or different inert substitutent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as

—O—, —S—, —S—S—, —$SO_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane and the like;
Di(hydroxyphenyl)sulfones such as bis-(4-hydroxyphenyl)sulfone,
2,4'-dihydroxydiphenyl sulfone,
5'-chloro-2,4-dihydroxydiphenyl sulfone,
5'-chloro-4,4'-dihydroxydiphenyl sulfone, and the like;
Di(hydroxyphenyl)ethers such as bis-(4-hydroxyphenyl)ether,
the 4,3'- 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that the polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compounds or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—$SO_2$—) bonding two halogen substituted benzenoid nuclei as in the 4,4'-dichlorodiphenyl sulfon and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent group which can activate displacement of halogens on two different rings, such as the sulfone group —SO$_2$—; the carbonyl group —CO—; the vinyl group

the sulfoxide group —SO—; the azo-group —=N—; the saturated fluorocarbon groups —CF$_2$CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

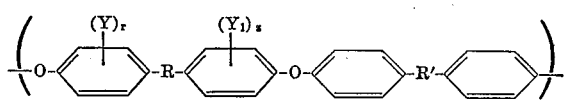

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula

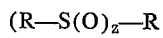

wherein each R represents a monovalent lower hydrocarbon group free of aliphatic unsaturation on the alpha carbon atom, and preferably contains less than about 8 carbon atoms or when connected together represents a divalent alkylene group with $z$ being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C., are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

For purposes of illustrating the thermal and dimensional stability of the adherent thermoplastic polyarylene polyethers of the present invention, Tables I and II below list comparative physical properties for adherent thermoplastic polyarylene polyether having the structure

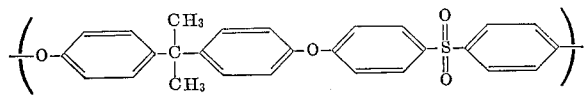

adherent polyhydroxyether, which is a bisphenol A polyhydroxyether of the structure

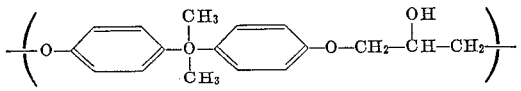

and adherent polycarbonate which is a bisphenol A polycarbonate of the formula

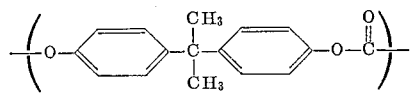

TABLE I

| | Polyarylene polyether | Polyhydroxyether | Polycarbonate |
|---|---|---|---|
| Tensile Modulus, p.s.i | 350,000 | 280,000 | 340,000 |
| Tensile Strength, p.s.i | 10,500 | 8,000 | 10,000 |
| Glass Transition Temp., ° F. (Tg) | 392 | 212 | 302 |
| Heat Distortion, ° F. at 264 p.s.i. | 350 | 185 | 270 |

TABLE II

| | Tensile Modulus, p.s.i. | | Tensile Strength, p.s.i. | |
|---|---|---|---|---|
| | Polyarylene polyether | Polycarbonate | Polyarylene polyether | Polycarbonate |
| Temp., ° F.: | | | | |
| 212 | 220,000 | 170,000 | 6,500 | 5,000 |
| 257 | 190,000 | 160,000 | 5,900 | 5,000 |
| 302 | 170,000 | 20,000 | 4,000 | 1,500 |
| 350 | 165,000 | Softened | 3,000 | Softened |
| 392 | 1,200 | | 100 | |

Tables I and II demonstrate that the particular adherent polyarylene polyether can be used in bonding applications at temperatures of up to about 350° F. whereas, the particular polyhydroxyether and polycarbonate can only be used at temperatures of up to about 185° F. and 270° F., respectively. The adherent of the present invention provides the versatility of thermoplastic materials yet is capable of withstanding elevated temperatures contrary to what has generally been thought of with respect to the high temperature capabilities of thermoplastic materials.

The superiority of thermoplastic polyarylene polyether over other thermoplastics in terms of bond strength at room temperature and at 350° F. is demonstrated in Table III. In each case, 1″ x 4″ metal strips of aluminum, cleaned by being wiped with methyl ethyl ketone, immersed successively for 10 minutes in 85 percent phosphoric acid, n-butyl alcohol, and tap water, and rinsed with tap water, were placed in a one-half inch end to end overlap with approximately 8 mils of the indicated thermoplastic between the strips. The polyarylene polyether, polyhydroxyether and polycarbonate are the same as in Tables I and II. Aluminum plates protected by aluminum foil were placed on either side of the lap joint assembly and the composite was placed in a heated press at 100 p.s.i. for the indicated dwell time at the indicated temperature, then removed to a press at 380° F. and then cooled to room temperature.

TABLE III

| Adherent Thermoplastic | Press Temperature, ° F. | Dwell Time, seconds | Average Lap Shear Strength [1] (p.s.i.) at 73° F. | Average Lap Shear Strength [1] at 350° F., p.s.i. |
|---|---|---|---|---|
| Polyarylene polyether | 1,000 | 270 | 3,640 | 1,950 |
| Polyhydroxyether | 700 | 40 | 2,850 | 0 |
| Polycarbonate | 700 | 60 | 1,540 | 0 |
| Polystyrene | 700 | 40 | 600 | 0 |
| Vinyl chloride/vinyl acetate copolymer | 500 | 40 | 570 | 0 |
| Polyethylene | 700 | 40 | 770 | 0 |
| Vinyl chloride/vinyl acetate/maleic acid copolymer | 600 | 20 | 1,060 | 0 |

[1] ASTM D-1002.

For purposes of demonstrating the creep resistance of the adherent thermoplastic polyarylene polyethers of this invention, 5 mils film of thermoplastic polyarylene polyether composed of recurring units having the formula

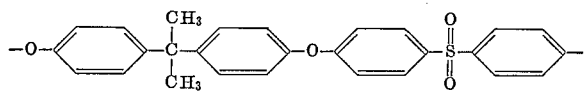

was employed to form a one-half inch lap joint between aluminum strips according to the procedure in Example 17. Creep resistance of the bond was tested according to MIL–A–5090D. A first laminate under a load of 1600 p.s.i. for 16 days at 73° F. showed no measurable creep. Creep measurements were made with an instrument accurate to 0.00005 inch. A second laminate under a load of 800 p.s.i. for 11 days at 300° F. showed no measurable creep. In contrast, a thermosetting epoxy widely employed as a creep resistant bonding material showed, in this test, under a load of 1600 p.s.i. for 8 days at 73° F. a creep of 0.0016 inch.

Thermoplastic polyarylene polyethers can be applied to adherends from solution as by spraying, dipping, brush flow coating, impregnation and the like; by melt application as in extrusion coating, powder coating, flame spraying and fluid bed coating and the like; and, importantly, by film laminating.

A highly surprising aspect of the present invention is the superior bonding effects achieved by bonding at very high temperatures, even at temperatures greatly in excess of what is considered the heat degradation temperature of the thermoplastic polyarylene polyethers.

It is a significant advantage of thermoplastic polyarylene polyethers as an adhesive bonding material that it is available in the form of a flat sheet or as film on a roll. Some of the advantages gained by use of thermoplastic polyarylene polyether film as an adhesive material include:

(1) Single component system, no mixing to form the adhesive.
(2) Unlimited shelf life.
(3) No liquids to be handled.
(4) No volatiles.
(5) No priming of the adherend necessary.
(6) No prolonged curing cycles.
(7) Bonds of great strength obtained.
(8) Readily controllable glue line thickness.
(9) Absolute freedom from pinholes.
(10) Ultra thin laminates feasible.
(11) Lower cost because less material required.
(12) No necessity of supporting web for film adhesive.
(13) Thermoplastic films readily produced by a variety of inexpensive means.
(14) Reproducible bonding effects; no vagaries due to cure cycles and storage.

Thermoplastic polyarylene polyethers lend themselves to coating virtually any surface having any contour. Moreover, a coating of polyarylene polyether is itself a base material to which other materials can be bonded, using the thermoplastic polyarylene polyether as the adhesive.

Although thermosetting adhesive films are known, their properties and advantages do not begin to compare with those of thermoplastic polyarylene polyether adhesive film. Whereas a thermosetting film requires a chemical reaction to bond, the thermoplastic polyarylene polyethers taught herein require only as much temperature and pressure as is necessary to make them flow into intimate contact with the adherend. A summary of advantages of thermoplastic polyarylene polyether film, over a typical thermosetting resin film, phenolic nitrile, is presented in Table IV below.

TABLE IV.—COMPARISON OF STORAGE, HANDLING AND APPLICATION CONDITIONS FOR BONDING FILMS

| Class | Thermosetting | Thermoplastic |
|---|---|---|
| Type of Resin | Phenolic Nitrile | Polyarylene polyether. |
| Form | Unsupported film, polyethylene liner | Unsupported film, no liner. |
| Volatile content | Film exposed for 1 hr. at 350° F., >5% wt. loss | 0. |
| Bonding Temperature | Min. 257° F.; 60 minutes at 350° F., and 150 p.s.i. recommended | 500° F. to 1,000° F. |
| Maximum Storage | 6 months at >40° F | Indefinite. |

The utility and uniqueness of thermoplastic polyarylene polyethers as an adhesive is partly due to the fact that the polyarylene polyethers are self-supporting and formable plastics in their own right. For example, a structural element like a stair tread for a ladder if molded of polyethylene must be fastened to the latter with some sort of mechanical fastener or separate adhesive. If the stair tread is fabricated of thermoplastic polyarylene polyether, the legs of the ladder can be heated and the polyarylene polyether stair tread pressed thereagainst. The structural element is thus assembled without fasteners or separate adhesive. Then, abrasive grains can be embedded in the upper surface of the stair tread to give a non-skid step, simply by pressing heated emery or other abrasive grain into the tread surface. If the tread were made of polyethylene, another adhesive would be required at the tread surface. In this illustration thermoplastic polyarylene polyether is being used as an adhesive, but advantage is taken also of its properties of easy moldability, great toughness and rigidity and moisture resistance.

In general, it can be stated that what is required to adhere thermoplastic polyarylene polyether to an adherend is to flux the polyarylene polyether at the interface of the two materials. Fluxing is flow under heat and usually pressure, and is easily accomplished by the input of sufficient heat into the area to be bonded. Fluxing can best be accomplished by heating either the substrate and pressing the thermoplastic polyarylene polyether thereagainst or heating the thermoplastic polyarylene polyether in some manner, e.g. radiant heating, convection, induction, electrically, ultrasonically, et cetera, and pressing the adherend against the polymer or a heated particulate adherend can be blown against the thermoplastic polyarylene polyether. It is to be emphasized that actual flow is not necessary, because the polyarylene polyether can be "activated" into bonding without flow, as occurs, for example, in some solution coatings. Generally, a short bake at moderate temperatures will improve the bond obtained from solution coatings. The use of pressure assists in obtaining good bonding. Typical of amorphous thermoplastics, polyarylene polyethers have no distinct melting point or narrow melting range but rather soften over a wide temperature range. At the lower end of the softening range, heat alone may not be sufficient to flux the resin as it is at the high end of the range, but a combination of mild heat and pressure will cause the polyarylene polyethers to flow.

It is preferred in this invention to fabricate the structural elements comprising the thermoplastic polyarylene polyether and the adherend at the highest temperature consistent with maintaining the integrity of the polyarylene polyether and the substrate. It is particularly preferred to bond at 700° F. and above, and especially at temperatures above the degradation temperature of the polyarylene polyether e.g. 900° F. and above but in cycles which allow so brief an exposure that the resin is only fluxed and not degraded.

The terms "structural element" and "structural elements" as used herein refer to an assembly or assemblies of one or more discrete, planar, curvilinear, rectangular, round or odd shaped objects and a thermoplastic polyarylene polyether. The assembly is characterized by an adhesive bond between a thermoplastic polyarylene polyether and the object or objects. The terms comprehend, therefore, structural elements comprising an adherend, such as a substrate and an adhering layer of thermoplastic polyarylene polyethers as in a two-ply laminate or a coated substrate; structural elements comprising an interlayer of thermoplastic polyarylene polyether sandwiched between and adhered to two similar or dissimilar adherends or laminae as in a plural ply laminate; structural elements comprising a thermoplastic polyarylene polyether matrix surrounding and adhered to as a bond and/or a support for variously shaped and sized adherends such as articles of varying porosities, for example as the bonding agent and/or substrate in fiber-reinforced plastic articles; structural elements comprising structural members bonded together either closely adjacent or spaced apart by thermoplastic polyarylene polyether elements; and combinations of the foregoing. The adherend preferably is readily wettable by the thermoplastic polyarylene polyether either because of a polar nature such as characterizes metals, glass, and wood and is absent in polyethylene or because of surface treatment or cleanliness or for any other reason.

Adherends having a tangible surface or surfaces, preferably a tangible wettable surface or surfaces, to which thermoplastic polyarylene polyether readily adheres include metals, polar materials, vitreous materials, proteinaceous materials, cutaneous materials, cellulosic materials, natural resins, synthetic organic polymeric material, nonmetallic materials, and the like. Adherends can be particulate, granular, fibrous, filamentary, ropy, woven, nonwoven, porous, nonporous, rigid, and nonrigid.

Metallic adherends include elementary metals such as aluminum, chromium, cobalt, copper, gold, iron, lead, magnesium, nickel, platinum, silver, tin, titanium, tungsten, vanadium, zinc, and the like, and alloys such as alloy steel, alnico, brass, bronze, carbon, steel, cast iron, chromium steel, Nichrome, pewter, solder, stainless steel, sterling silver, and the like. Metallic adherends can be powdered, granular, or in the form of leaf, foil, sheet, bar, rod, and the like.

Thermoplastic polyarylene polyether is used to fasten metal articles such as letters and numerals to metallic or ceramic or like substrates, to bond propellers to drive shafts, to fix handles onto metal, especially iron and aluminum pots, and metal doors, to bond bearing surfaces to a strong substrate, to bond a "veneer" of costly metals to less expensive metallic substrates for use as a chemical reactor, and to bond dissimilar metals to form a thermocouple or similar bimetallic element. Laminates of polyarylene polyether and metal foil or sheet can be cold formed into a variety of useful structural elements such as gutters, downspouts, ductwork and the like.

Vitreous adherends include glass, glassware, ceramics, clays, enameled materials, china, porcelain and the like. Cellulosic adherends include wood, plywood, sawdust, cane, bamboo, rattan, paper, and the like.

Natural resin adherends include asphalt, bitumen, gums, lacquer, pitch, rosin, rubber, shellac, tar, varnish and the like. Synthetic organic polymeric adherends include thermosetting polymers such as phenolaldehyde type polymers, coumarone indene polymers, phenolurea polymers, epoxy resins and the like, and thermoplastic polymers such as polyolefins, polystyrenes, polycarbonates, polyformaldehydes, polyvinyls, synthetic rubber such as neoprene and the like, nylon and the like.

Among nonmetallic adherends can be mentioned dyes such as aniline dyes, azo dyes, mordant dyes, and the like, pigments such as aniline black, bone black, ink black, ash, iron grey, cadmium yellow, and the like, minerals such as bauxite, carbon, clay, coal, coke, graphite, gypsum, lime, mica, peat, silica, talc, vermiculite, and the like, rock, stone and gravel such as chalk, lava, limestone, marble, quartz, shale, slate, and the like, building materials such as brick, plaster, tile, wallboard, cement, and the like, fabrics such as broadcloth, burlap, canvas, cotton, Dacron, denim, felt, glass fiber cloth, gunny, linen, nylon, Orlon, rayon, silk wool, and the like, fibers and filaments such as flax, glass, hemp, jute, manila, oakum, raffia, sisal, and the like, cords such as gut, rope, twine, whipcord, and the like, pelts, furs, hides, leathers and the like.

Adherent thermoplastic polyarylene polyether is used to bond glass fibers, woven and non-woven glass fiber cloth, glass fiber mats and bats, into laminated articles having utility as an automotive or building structural elements, into prepreg, post formable laminates which can be formed into useful articles such as automobile fenders and the like, and into filament wound structures such as pipe and high pressure tanks.

Because of the excellent high temperature characteristics of thermoplastic polyarylene polyethers, structural elements comprising adherent thermoplastic polyarylene polyether and an adherend find particular utility in applications where the bond must withstand the rigors of elevated temperatures, for example in excess of 300° F. Because of this unique capability, such structural elements can be used in applications heretofore unthought of for composite thermoplastic structural elements. Examples of such structural elements are turbine engine components, blower fans for air cooled gasoline engines, fan belts, automotive underhood clips, manifold emission valves, pipes and tanks for conveying and storing hot liquids, reactor vessels, electrical housings, oven components, and the like.

Further illustrations of adherends, adhering techniques and end product structural elements are given in the examples below.

The following test procedures were followed in obtaining data reported herein:

Tensile properties—ASTM D-638-60T.
Flexural properties—ASTM D-790-59T.
Lap shear strength—ASTM D-1002.
Heat distortion temperature—ASTM D-1637-59T.
Peel strength—ASTM D-903-49T.
Creep resistance—MIL-A-5090D.
Bend strength—Epstein, Adhesion to Metals, p. 130.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution Glass transition temperature ($T_g$), commonly referred to as second order phase transition temperatures, refers to the inflection temperatures found by plotting the resilience (recovery from 1 percent elongation) of a film ranging in thickness from 3–15 mils against the temperature. A detailed explanation for determining resilience and inflection temperature is to be found in an article by Alexander Brown, Textile Research Journal volume 25, 1955, at page 891.

The following examples are illustrative of the present invention and are not intended to limit the same in any manner. All parts and percentages are by weight unless indicated otherwise.

Example 1.—Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 moles), 13.1 grams of a 42.8% potassium hydroxide solution (0.1 moles KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C., consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulating in a Waring blender, and the finely divided white polymer was filtered and then dried in a vacuum oven at 100° for 16 hours. The yield was 22.2 g. (100%) and the reaction was 99% complete based on a titration for residual base.

The polymer had the basic structure

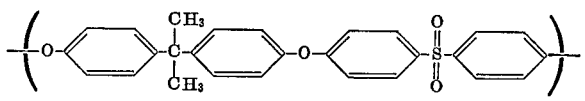

inch thick aluminum sheet. The strips had previously been cleaned in an acid bath as described in Example 32. The coatings were air dried for 15 minutes at room temperature and then at 160° C. for 15 miuntes. The dried coatings were about 0.4 mil thick. The ends of two aluminum strips were overlapped one-half inch giving an assembly of aluminum-thermoplastic polyarylene polyether-aluminum. The overlapped strips were encased between two metal plates of a 7" x 10" jig. The entire assembly was placed between two electrically heated molding platens. The hot platens were closed without applying pressure (dwell time) to allow the polyarylene polyether to flux and then pressure was applied for a given period of time (pressure time). The jig was transferred to a second press in which cooling water was circulated and the bonded strips were allowed to cool under pressure. Bond strength was measured as lap shear using a Tinius-Olsen tester according to the procedure of ASTM D–1002, run at a cross-head speed of 0.05 in./min. Bonding conditions and results are summarized in Table V. It should be noted that in each example, three sets of aluminum strips were bonded under identical conditions and the lap shear strength for each was measured. The lap shear strength given in Table V is the average of the three values obtained.

TABLE V

| Example: | Polyarylene Polyether reduced viscosity | Bonding Temperature, °F. | Dwell Time, min. | Bonding Pressure, p.s.i. | Pressure Time, min. | Average Lap Shear Strength, p.s.i. |
|---|---|---|---|---|---|---|
| 2 | 0.52 | 600 | 2 | 120 | 3 | 1,710 |
| 3 | 0.66 | 600 | 2 | 120 | 3 | 1,390 |
| 4 | 0.66 | 700 | 2 | 60 | 3 | 2,160 |
| 5 | 0.66 | 700 | 2 | 80 | 10 | 2,500 |
| 6 | 0.66 | 700 | 2 | 80 | 10 | [1] 2,833 |
| 7 | 0.66 | 800 | 2 | 80 | 3 | 3,330 |
| 8 | 0.66 | 800 | 2 | 80 | 10 | 3,060 |
| 9 | 0.66 | 900 | 2 | 80 | 3 | 4,130 |
| 10 | 0.66 | 900 | 1 | 80 | 1 | 1,830 |
| 11 | 0.66 | 900 | 2 | 80 | 1 | 2,860 |
| 12 | 0.66 | 900 | 2 | 80 | 5 | 1,200 |
| 13 | 0.52 | 900 | 2 | 80 | 3 | 2,930 |
| 14 | 0.66 | 900 | 2 | 80 | 3 | 3,890 |

[1] Transferred to 500° press to partly cool before completely cooling.

Examples 15–16

The bonding procedure for Examples 2–14 was followed except that before being solution coated, the aluminum strips were pretreated by dipping in a cleaning solution comprising 2 ounces of a powdered, silicated, inhibited, alkaline cleaner (Ridoline 53) in one gallon of water for 5 minutes at 160° F. Thereafter the strips were rinsed in running cold water for 10 minutes, finally in distilled water and then dried for 10 minutes at 100° C. Bonding conditions and results are given in Table VI.

TABLE VI

| Example: | Polyarylene Polyether reduced viscosity | Bonding Temperature, °F. | Dwell Time, min. | Bonding Pressure, p.s.i. | Pressure Time, min. | Average Lap Shear Strength p.s.i. |
|---|---|---|---|---|---|---|
| 15 | 0.52 | 900 | 2 | 80 | 3 | 2,440 |
| 16 | 0.66 | 900 | 2 | 80 | 3 | 3,790 |
| 16A | 0.31 | 700 | 2 | 10 | 3 | 1,180 |

ADHESION OF POLYARYLENE POLYETHER TO METAL

Examples 2–14

Thermoplastic polyarylene polyether, prepared as in Example 1, was dissolved in a solvent mixture comprising 60 percent toluene, 25 percent acetone, and 10 percent cyclohexanone in an amount sufficient to produce a 25 percent solution of the polymer. The solution was then coated using an 18 mil blade onto 4" x 1" strips of 0.064

Examples 17–24

The alkaline cleaning procedure for pretreating the aluminum strips described for Examples 15 and 16 was followed and the bonding procedure for Examples 2–14 was followed except that in place of a solution coated polymer, a 5 mil film of thermoplastic polyarylene polyether prepared as in Example 1 having a reduced viscosity of 0.66 was used. Bonding conditions and results are given in Table VIII.

TABLE VII

| Example: | Bonding Temperature, °F. | Dwell Time, min. | Bonding Pressure, p.s.i. | Pressure Time, min. | Average Lap Shear Strength, p.s.i. |
|---|---|---|---|---|---|
| 17 | 1,000 | 0 | 80 | 3 | 3,720 |
| 18 | 1,000 | 0 | | 2 | 2,590 |
| 19 | 1,000 | 0 | | 4 | 1,940 |
| 20 | 900 | 0 | | 4 | 2,610 |
| 21 | 900 | 0 | | 5 | 2,470 |
| 22 | 1,000 | 0 | | 3 | 3,240 |
| 23 | 1,000 | 0 | | 3 | [1]4,060 |
| 24 | 1,000 | 0 | | 3 | [2]3,880 |

[1] Polyarylene polyether film dried for 20 hours at 130° C.
[2] Aluminum strips primed with a 5% solution of 0.66 RV polyarylene polyether, prepared as in Example 1, and dried for 15 minutes at 100° C.

Example 25

The alkaline cleaning procedure for pretreating the aluminum strips described for Examples 15 and 16 was followed and the bonding procedure for Examples 2-14 was followed except that in place of a solution coated polymer, the thermoplastic polyarylene polyether was deposited onto the surface of the aluminum in the form of a fine powder. The polyarylene polyether was prepared as described in Example 1 having a reduced viscosity of 0.49. The samples were pressed for 3 minutes at 1000° F. and 80 p.s.i. Average lap shear strength was 1680 p.s.i.

Example 26

The polyarylene polyether (RV=0.66) solution described for Examples 2-14 was coated onto aluminum strips pretreated as in Examples 15 and 16. The coating was air dried for 30 minutes, then for 15 minutes at 212° F. and for 10 minutes at 500° F. Overlapped strips were then pressed without using a jig for 3 minutes at 700° F. Lap shear strength of the structural element was 2600 p.s.i.

Example 27

Thermoplastic polyarylene polyether having the formula

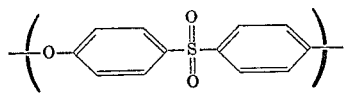

was prepared from 4,4'-dihydroxydiphenyl sulfone and 4,4'-dichlorodiphenyl sulfone according to the procedure in Example 1. The polymer had a reduced viscosity of 0.55. The polymer was ground into a fine powder and placed between the one-half inch overlap of two 4" x 1" x 0.064" aluminum strips pretreated as in Examples 15 and 16. The strips were placed in the 7" x 10" jig and the assembly placed between the platens of an electrically heated molding press. A pressure of 80 p.s.i. was applied for 3 minutes at 1000° F. Lap shear strength of the structural element of this example was 3000 p.s.i.

Example 28

Example 27 was duplicated using instead a thermoplastic polyarylene polyether having the formula

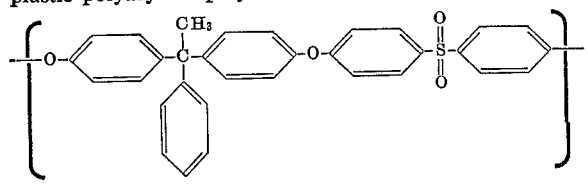

prepared from the bisphenol of acetophenone and 4,4'-dichlorodiphenyl sulfone according to the procedure of Example 1. The polymer had a reduced viscosity of 0.66, lap shear strength of a structural element prepared with the polyarylene polyether of this example was 3340 p.s.i.

Example 29

Example 27 is duplicated using instead a thermoplastic polyarylene polyether having the formula

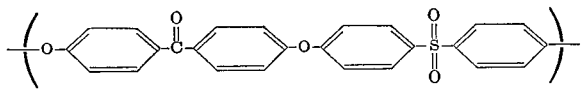

prepared from the bisphenol of benzophenone and 4,4'-dichlorodiphenyl sulfone according to the procedure in Example 1. Lap shear strength of a structural element prepared with the polyarylene polyether of this example is comparable to that of Example 27.

Example 30

Example 27 is duplcated using instead a thremoplastic polyarylene polyether having the formula

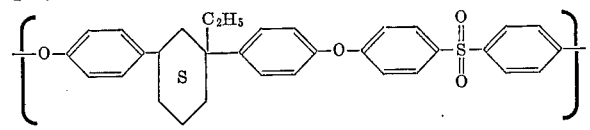

prepared from the bisphenol of vinyl cyclohexene (prepared by an acid catalyzed condensation of 2 moles of phenol with one mole of vinyl cyclohexane) and 4,4'-dichlorodiphenyl sulfone. Lap shear strength is comparable to that of Example 27.

Example 31

Thermoplastic polyarylene polyether having the formula

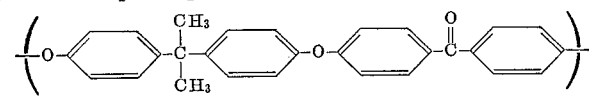

was prepared from 2,2'-bis-(4-hydroxyphenyl)propane and 4,4'-difluorobenzophenone according to the procedure in Example 1. The polymer had a reduced viscosity of 0.49. The polymer was ground into a fine powder and placed between the one-half inch overlap of two 4" x 1" x 0.64" aluminum strips pretreated as in Examples 15 and 16. The strips were placed in the 7" x 10" jig and the assembly placed between the platens of an electrically heated molding press. A pressure of 80 p.s.i. was applied for 3 minutes at 1000° F. Lap shear strength of the structural element of this example was 3250 p.s.i.

Example 32

Strips of aluminum sheet measuring 4" x 1" x 0.064" were pretreated by dipping in an acid cleaning bath for 10 minutes at 140° F. The acid bath consisted of 44 parts by weight of potassium dichlormate in 250 cc. concentrated sulfuric acid and 1800 cc. distilled water. The strips were rinsed in cold running water for 10 minutes, rinsed in distilled water and dried for 10 minutes at 212° F. Five sets of six pairs each of the treated strips were overlapped one-half inch at their ends and bonded by interposing therebetween a thermoplastic polyarylene polyether film 5 mls thick prepared as in Example 1 and having a reduced viscosity of 0.66. Bonding was accomplished by placing the overlapped strips with the polymer film therebetween between the plates of a 7" x 10" jig. The jig was then placed between the platens of an electrically heated molding press heated to 1000° F. The platens were closed and a bonding pressure of 80 p.s.i. was applied at that temperature for a duration of 3 minutes. Thereafter, the jig was transferred to a cold press (65° F.) and allowed to cool under 80 p.s.i. for 10 minutes. Within 10 minutes the structural laminate was cool enough to be removed from the press by hand. One laminate from each of the five sets was tested for lap shear strength at room temperature according to the ASTM D-1002. In addition, four sets of the laminates were tested for average lap shear strength at different temperatures. This demonstrates the ability of thermoplastic polyarylene polyether to retain its adhesion properties at temperatures far beyond what is expected from thermoplastic materials in general. Three laminates from one set were also tested for bend strength. The U.S. Air Force requirement for bend strength is 150 p.s.i. Results are summarized in

TABLE VIII

| Set= | Room Temperature Lap Shear Strength, p.s.i. | Lap Shear Test Temp., °F. | Average Lap Shear Strength, p.s.i. | Average Bend Strength, p.s.i. | No. of Laminates Tested |
|---|---|---|---|---|---|
| 1 | 3,280 | −67 | 3,340 | | 6 |
| 2 | 3,900 | 300 | 2,170 | | 5 |
| 3 | 3,340 | 350 | 1,950 | | 5 |
| 4 | 3,560 | 400 | 515 | | 6 |
| 5 | 3,140 | | | 646 | 3 |

The foregoing examples illustrate bonding of thermoplastic polyarylene polyether to aluminum. Results with aluminum substrates are generally regarded in the industry as typical of adhesive properties of a material, hence, a material showing outstanding adhesion to aluminum, as thermoplastic polyarylene polyether is evidenced to do in the preceding examples, would be expected to adhere well to most other metal substrates. That this is is fact true is shown by the following examples.

Examples 33–35

Thermoplastic polyarylene polyether film, 5 mils thick, prepared according to the procedure of Example 1 and having a reduced viscosity of 0.66, was employed to bond various metal strips together. The metal strips, measuring 4" x 1" x 1/32" were pretreated in an alkaline cleaning bath for 5 minutes at 150° F. as in Examples 15–16. The ends of two strips were overlapped one-half inch with the polymer film therebetween. The strips and film were then placed between the plates of a 7" x 10" jig which was placed between the platens of an electrically heated molding press. The platens, heated to 1000° F., were closed and a bonding pressure of 80 p.s.i. was applied for 3 minutes. The jig was then transferred to a cold press (65° F.) and allowed to cool under 80 p.s.i. for 10 minutes. The lap shear strength of each laminate was then measured according to ASTM D–1002. Results are summarized in Table IX.

TABLE IX

| Example: | First Strip | Second Strip | Lap Shear Strength, p.s.i. |
|---|---|---|---|
| 33 | Galvanized Iron | Galvanized Iron | [1]1,940 |
| 34 | Cold Rolled Steel | Copper | 1,140 |
| 35 | do | Nickel,[2] Silver | 1,120 |

[1] Failure occurred between the galvanized zinc and the iron rather than between the polymer and metal.
[2] Nickel silver is 17% zinc, 18% nickel, 65% copper.

Example 36

Strips of 4" x 1" cold rolled steel sheet were pretreated in an alkaline cleaning bath for 5 minutes at 150° F. as in Examples 15 and 16. The ends of the cleaned strips were coated with a 25 percent solution of polyarylene polyether prepared according to Example 1 and having a reduced viscosity of 0.66 in a solvent mixture comprising 65 percent toluene, 25 percent acetone and 10 percent cyclohexanone. The coatings were air dried overnight and then for 15 minutes at 100° C. The coated ends of two pairs of strips overlapped one-half inch, coated side in, and pressed at 700° F. for 5 minutes under 80 p.s.i. After cooling the lap shear strength of the structures were measured as 1600 p.s.i. and 1960 p.s.i.

Example 37

Strips of cold rolled steel were pretreated as in Example 36 and the ends primed with a 5 percent solution of the polyarylene polyether in the solvent mixture described in Example 36. The coatings were dried overnight and then for 10 minutes at 500° F. The primed ends of the steel strips were overlapped one-half inch and 8 mil polyarylene polyether film prepared as in Example 1 having a reduced viscosity of 0.66 was interposed therebetween. The primed strips were bonded together for 3 minutes at 700° F. using 80 p.s.i. Lap shear strength of the laminate was 3000 p.s.i.

Example 38

A strip of cold rolled steel, 3" x 1" x 32 mils, and a strip of stainless steel, 3" x 1" x 11 mils, were pretreated and primed as the strips in Example 37. The two strips were overlapped one-half inch and bonded together using 8 mil film as described in Example 37. In testing for lap shear strength, the stainless steel strip broke at 1600 p.s.i. Peel strength was 19 pounds per inch.

Example 39

Example 38 was duplicated using instead a one-quarter inch overlap between the primed ends of the metal strips. Lap shear strength was 2000 p.s.i.

Example 40

Two cold rolled steel panels measuring 5" x 3" x .032" were dip coated in a solution of thermoplastic polyarylene polyether, prepared according to Example 1 having a reduced viscosity of 0.50, in a solvent mixture comprising 60 percent toluene, 20 percent acetone, and 20 percent cyclohexanone. Each panel was dried under varying conditons and tested for impact at 160 ft.-lbs. The coatings were also subject to the "Scotch Tape" test whereby a number of lines were scored with a razor blade 1/16" apart in a checkerboard arrangement and a strip of pressure sensitive adhesive tape was firmly applied to the coating and rapidly stripped off by hand. If none of the polymer coating was removed with the Scotch Tape, the coating was rated as passing the test. If any polymer coating was removed with the Scotch Tape, the coating was rated as failing the test. Results for the three panels are summarized below.

| | Panel # | |
|---|---|---|
| | 1 | 2 |
| Percent polyarylene polyether in solution | 20 | 30. |
| Drying time in air | | 20 min. |
| Drying time at 200°F | | 15 min. |
| Drying time at 400 °F | 10 min | 10 min. |
| Thickness of coating (mils) | 1.5 | 2.25. |
| Impact at 160 in./lb | No Failure | No Failure. |
| Scotch Tape Test | Passed | Passed. |

The foregoing examples demonstrate the excellent adhesion of polyarylene polyether to various metals, the ease with which bonding can be accomplished, and the excellent bond strengths of the resulting structural elements.

ADHESION OF POLYARYLENE POLYETHER TO POLYMER MATERIALS

Example 41

The 25 percent solution of thermoplastic polyarylene polyether previously described for Examples 2–14 was coated onto high density polyethylene sheet the surface of which had been flame treated. The coating was allowed to dry for 2 days at 100° C. The coating was scored five times horizontally and five times vertically with a razor blade so as to form 16 boxes in the coating. Adhesion of the coating was tested by the "Scotch Tape" test. Tape was firmly pressed down over the scored coating and stripped off quickly by hand. The test indicated that about 70 percent of the coating was not removed by the tape and remained adhered to the polyethylene sheet. This example demonstrates the good adhesion of polyarylene polyethers to a material which in general remains inert to most adhesive material.

Example 42

Polyvinyl chloride (sold under the designation VSA–3310 by Union Carbide Corporation) was pressed into a 6" x 6" x 1/8" plaque. A 4" x 1" strip was cut from the plaque and bonded to a 4" x 1" x 0.080" strip of thermoplastic polyarylene polyether prepared according to Example 1 having a reduced viscosity of 0.52 in an end to end one-half inch overlap. The end of the polyarylene polyether strip was activated with a thin layer of methylene chloride and the two overlapped polymer strips pressed under 500 p.s.i. for 15 minutes at 200° F. The lap shear strength of the bond was 200 p.s.i.

Example 43

Example 42 was duplicated using in place of the polyvinyl chloride, polystyrene (sold under the designation SMD–3500 by the Union Carbide Corporation). The lap shear strength of the bond was 200 p.s.i.

Example 44

Example 42 was duplicated using in place of the polyvinyl chloride, polycarbonate (sold under the designation Lexan 101 by the General Electric Co.). In testing for lap shear strength, the strip of polyarylene polyether failed at 1400 p.s.i. The bond between the two polymer strips remained intact.

Example 45

Example 42 was duplicated using in place of the polyvinyl chloride, bisphenol A polyhydroxyether. In testing for lap shear strength the polyhydroxyether strip failed at 760 p.s.i. while the bond between the two polymer strips remained intact.

Example 46

Example 42 was duplicated using in place of the polyvinyl chloride a strip of polytetrafluoroethylene film 5 mils thick. Bonding was carried out under 100 p.s.i. for 10 minutes at 75° F. In testing for lap shear strength, the polytetrafluoroethylene film failed at 2.2 p.s.i.

Example 47

A 1/8" thick sheet of a phenol-formaldehyde resin was cut into 4" x 1" strips. The phenolic strips were bonded to 4" x 1" x 0.080" strips of thermoplastic polyarylene polyether prepared according to Example 1 having a reduced viscosity of 0.50 in a one-half inch end to end overlap. The end of the polyarylene polyether strip was activated with a thin layer of methylene chloride and the two overlapped polymer strips pressed under 500 p.s.i. for 5 minutes at room temperature. Two laminates were prepared in this manner. The lap shear strengths of the bonds were 50 and 52 p.s.i.

Example 48

Example 47 was duplicated using a sheet of epoxy/glass cloth laminate in place of the phenolic sheet. The epoxy resin was a solid diepoxide based on bisphenol A and epichlorohydrin (assay=500 gm./gm. mol.) cured with dicyanodiamide. The lap shear strength of the bonds was 60 p.s.i.

Example 49

A 1/8" thick sheet of a phenol-formaldehyde resin was cut into a 4" x 1" strip. This strip was bonded to a 4" x 1" x .080" strip of thermoplastic polyarylene polyether prepared according to Example 1 having a reduced viscosity of .50 in a one-half inch end to end overlap. The end of the polyarylene polyether strip was primed with a 25 percent solution of polyarylene polyether as described for Examples 2–14, and the two overlapped polymer strips pressed together with paper clamps until the bond was dry. The lap shear strength of the bond was 160 p.s.i.

Example 50

Example 49 was duplicated using a sheet of epoxy/glass cloth laminate described in Example 49 in place of the phenolic sheet. The lap shear strength of the bond was 240 p.s.i.

Example 51

Example 49 was duplicated except the bonded polymer strips were dried for one hour at 110° C. under a vacuum. The lap shear strength of the bond in this example was 130 p.s.i.

Example 52

Example 50 was duplicated except the bonded polymer strips were dried for one hour at 110° C. under a vacuum. The lap shear strength of the bond in this example was 220 p.s.i.

ADHESION OF POLYARYLENE POLYETHER TO VITREOUS MATERIALS

Example 53

Two one-inch squares 1/8" thick ceramic tile were bonded together with thermoplastic polyarylene polyether film 2.5 mils thick prepared according to the Example 1 having a reduced viscosity of 0.66. Four layers of the film were placed between the two tiles and the assembly placed in an electrically heated molding press at 400° F. The platens were closed but without applying pressure to the tiles and film. The temperature was raised to 680° F. and 2 tons of pressure applied. The heat was turned off and the press allowed to cool to 600° F. Cool water was then circulated through the press while maintaining the pressure. The tile laminate was removed when cooled and scattered with a hammer. Failure occurred in the tile only. The tile-polyarylene polyether bond remained intact.

Example 54

Three glass panels measuring 5" x 5" x 1/8" were cleaned with a solvent mixture comprising 65 percent toluene, 25 percent acetone, and 10 percent cyclohexanone. Two of the glass panels were placed flat in an edge to edge relationship. The third panel was placed over the other two and was centered over the edge to edge joint. Between the overlapping panels was interposed a 25 percent solution of thermoplastic polyarylene polyether, prepared according to Example 1 having a reduced viscosity of 0.66, in a solvent mixture comprising 65 percent toluene, 25 percent acetone, and 10 percent cyclohexanone. An eight pound weight was placed on top of the third panel and the assembly allowed to dry in air at room temperature for about 2 hours. The panels were then placed in an electrically heated press whose platens were at 600° F. A pressure of 50 p.s.i. was then applied and the press allowed to cool under this pressure. The pressure was maintained overnight after which the glass laminate was removed from the press. The laminate was tested for lap shear strength and cleavage, but in both instances failure occurred in the glass whereas the polyarylene polyether bond remained intact. This example demonstrates that polyarylene polyethers can be used to make laminated safety glass having stability at elevated temperatures higher than heretofore possible with thermoplastic adhesives.

Example 55

Example 54 was duplicated using in place of the polymer solution a 10 mil film of thermoplastic polyarylene polyether film prepared according to Example 1 having a reduced viscosity of 0.66. Press temperature was initially 250° F. and was raised to 630° F. before being allowed to cool under pressure. Pressure was applied at 550° F. Results were the same as in Example 54.

ADHESION OF POLYARYLENE POLYETHER TO PARTICULATE MATERIAL

Example 56

A 25 percent solution of polyarylene polyether, described in Examples 2–14, was mixed with powdered molybdenum disulfide such that the polyarylene polyether comprised 10 percent by weight of the mixture based on the weight of the molybdenum disulfide. The mixture was pressed into an 85 mil thick sheet at 650° F. under 15,000 p.s.i. for one-half hour. After cooling, two, one inch wide strips were cut from the sheet and tested for tensile strength. Tensile strengths were 2030 and 2190 p.s.i. This example demonstrates the excellent adhesion of polyarylene polyethers with particulate material and indicates that self-lubricating structures such as a bearing, having excellent physical properties, can be prepared using polyarylene polyethers as the bonding agent.

Example 57

Example 56 is duplicated using short fibers of polytetrafluoroethylene in place of the powdered molybdenum disulfide. Results are similar to those of Example 60.

Example 58

Example 56 is duplicated using powdered polytetrafluoroethylene in place of the powdered molybdenum disulfide. Results are similar to those of Example 61. This example and the previous example demonstrate that structures having self lubricating characteristics, such as a bearing, using polyarylene polyethers as the bonding agent. Such structures, which can also include other components such as molybdenum disulfide, possess exellent high temperature characteristics heretofore unattainable with thermoplastic materials. As such, these structures find wider utility and can be used in place of more costly thermoset materials.

Example 59

A 25 percent solution of polyarylene polyether, described in Examples 2–14, was mixed with powdered iron oxide such that the polyarylene polyether comprised 10 percent by weight of the mixture based on the weight of the iron oxide. The mixture was placed in a plaque mold and dried at 175° C. for one hour. The plaque was cooled and broken into small pieces which were subsequently pressed at 650° F. under 15,000 p.s.i. into a 175 mil thick plaque. A one-inch wide strip cut from the plaque was tested and found to have a tensile strength of 3380 p.s.i. This example demonstrates that structures having magnetic characteristics can be prepared using polyarylene polyethers as the bonding agent.

Example 60

A 25 percent solution of polyarylene polyether, described in Examples 2–14, was mixed with aluminum oxide #80 grit such that the polymer comprised 10 percent by weight of the mixture based on the weight of the grit. The mixture was partly dried and then poured into a "dog-bone" mold. Molding was carried out at 650° F. for 20 minutes under 15,000 p.s.i. After cooling, the specimen was removed from the mold and placed in a vacuum oven at 130° C. overnight. After being removed from the oven and cooled, the specimen exhibited a tensile strength of 620 p.s.i. which was the limit of the tensile tester used indicating that the tensile strength was even higher than 620 p.s.i.

Example 61

Example 60 was duplicated using in place of the polymer solution, powdered polyarylene polyether prepared as in Example 1 having a reduced viscosity of 0.66. The molded speciment had a tensile strength of 265 p.s.i.

Example 62

Three hundred and twenty grams of a 25 percent solution of thermoplastic polyarylene polyether, described in Examples 2–14 was blended with 2000 grams of rockwood sand. The blend contained 3.84 percent of polyarylene polyether. The blend was screened through a 30 mesh screen and pressed into a one-inch thick "dog-bone" tensile bar, for 4 minutes at 900° F. under 5 tons of pressure. After cooling, the "dog-bone" was tested and found to have a tensile strength of 150 p.s.i. and a surface hardness of 95 measured with a Dietert Gauge. This example demonstrates that mild structures useful for casting metal parts can be fabricated using polyarylene polyethers as the bonding agent for the sand mold.

Example 63

Conductive carbon black was blended with a 25 percent solution of thermoplastic polyarylene polyether, described in Examples 2–14, such that the polymer comprised 23 percent by weight of the blend based on the weight of the carbon black. A solvent mixture comprising 65 percent toluene, 25 percent acetone and 10 percent cyclohexanone was added to the blend to make a slurry which was then placed in a glass jar and rolled for 24 hours. The slurry was poured into a shallow pan and dried under a vacuum at room temperature for 7 hours and at 110° C. for 4 hours. The dried cake was ground and pressed into a ⅛" plaque under 1700 p.s.i. at 590° F. for 5 minutes. The volume resistivity of a one-inch wide strip cut from the plaque was 7.5 ohm-cm. Tensile strength of the strip was excellent.

Example 64

Example 63 was duplicated three times using 40, 60, and 75 percent of thermoplastic polyarylene polyether. Volume resistivities were 24, 280, and 1970 ohm-cm. respectively and the tensile strength of each strip was excellent. This example and the previous example demonstrated that structures having electrical properties rendering them useful as electrodes and the like can be prepared using polyarylene polyethers as the bonding agent.

ADHESION OF POLYARYLENE POLYETHER TO GLASS FIBERS AND CLOTH

Example 65

Laminates of glass cloth (181 weave) sized with a methacrylato chromic chloride complex in isopropanol and thermoplastic polyarylene polyether were prepared by either of two methods:

(A) Alternately laying down layers of glass cloth and a 1.2 mil thick film of thermoplastic polyarylene polyether prepared according to Example 1 having a reduced viscosity of 0.49 until the desired polymer content was obtained.

(B) Dip coating glass cloth in a 20 percent solution of thermoplastic polyarylene polyether, prepared according to Example 1 having a reduced viscosity of 0.47, and drying in air at room temperature.

In both methods, the laminates were preheated in a press for 10 minutes at 600° F. without applying pressure. A pressure of 600 p.s.i. was then applied for 10 minutes. After cooling, the laminates were tested for physical properties. Conditions and test results are summarized below.

|  | Test Temperature, ° F. | | |
|---|---|---|---|
|  | 77° | 77° | 350 |
| Method of Preparation | A | B | B |
| Percent Polyarylene Polyether | 35.8 | 34.2 | 34.2 |
| No. of Glass Plies | 18 | 12 | 12 |
| Flexural strength, p.s.i.×10³ | 49 | 53.4 | 40.6 |
| Flexural modulus, p.s.i.×10⁶ | 2.4 | 2.7 | 2.69 |
| Tensile strength, p.s.i.×10³ | 37 | 42.7 | 24 |
| Tensile modulus, p.s.i.×10⁶ | 2.3 | 2.6 | 2.24 |
| Percent elongation | 1.8 | 1.8 |  |

Example 66

Example 65 was duplicated using instead a thermoplastic polyarylene polyether having the formula

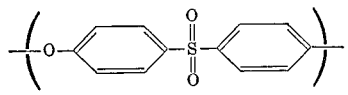

prepared from 4,4'-dihydroxydiphenyl sulfone and 4,4'-dichlorodiphenyl sulfone according to the procedure of Example 1 and having a reduced viscosity of 0.39 to prepare the laminates. Conditions and test results are summarized below.

|  | Test Temperature, ° F. | | |
|---|---|---|---|
|  | 77° | 350° | 437° |
| Method of Preparation | A | A | A |
| Percent polyarylene polyether | 35 | 35 | 35 |
| No. of Glass Plies | 12 | 12 | 12 |
| Flexural Modulus, p.s.i.×10⁶ | 2.62 | 2.47 | 1.29 |
| Flexural Strength, p.s.i.×10³ | 56.3 | 42.4 | 17.8 |

Example 67

Owens-Corning M8620 continuous strand "swirl" mat was interdispersed in alternating layers with thermoplastic polyarylene polyether pellets prepared according to Example 1 having a reduced viscosity of 0.53. When the desired proportion of glass mat to polymer was obtained, the laminate was preheated in a press at 550° F. for 5 minutes without applying pressure. The laminate was then compressed under 350–400 p.s.i. for 15 minutes at the same temperature and allowed to cool under pressure. Test results are summarized below.

|  | Test Temperature, ° F. | | |
|---|---|---|---|
|  | 77° | 392° | 500° |
| Percent polyarylene polyether | 50 | 50 | 50 |
| Flexural Strength, p.s.i.×10³ | 45.2 | 42.9 | 30.9 |
| Flexural Modulus, p.s.i.×10⁶ | 1.68 | 2.05 | 1.57 |

Post forming of the laminate prepared in this example was carried out using a 12 inch diameter pan mold one and one-half inches deep. Post forming was carried out by preheating the laminate to about 475° F. and forming against the unheated mold for one minute under about 4000 p.s.i. Reproduction of the mold was excellent.

Example 68

Bulk glass fibers were bonded with thermoplastic polyarylene polyether according to the following procedures:

(C) 160 grams of polyarylene polyether prepared according to Example 1 having a reduced viscosity of 0.66 was fluxed in a two-roll mill at 550–70° F. 40 grams of bulk glass fibers were slowly added and milled in. The blend was sheeted from the mill.

(D) 40 grams of bulk glass fibers were placed in a 1500 ml. beaker to which was added 170 grams of a 10 percent solution of thermoplastic polyarylene polyether, prepared according to Example 1 having a reduced viscosity of 0.66, in a solvent mixture comprising 65 percent toluene, 25 percent acetone, and 10 percent cyclohexanone. The mixture was dried in a vacuum oven at 110° C. until the solvents were driven off.

In both procedures (C) and (D), plaques were molded at 600° F. under 1000 p.s.i. for 10 minutes. One inch strips were cut from each plaque and measured for physical properties. Results are summarized below:

| Method of Preparation | C | D |
|---|---|---|
| Strip thickness, mils | 75 | 60 |
| Percent polyarylene polyether | 20 | 30 |
| Tensile strength, p.s.i. | 9,220 | 9,580 |
| Modulus of elasticity, p.s.i.×10⁵ | 5.02 | 11.3 |
| Percent elongation | 3.48 | 0.88 |

ADHESION OF POLYARYLENE POLYETHER TO OTHER SUBSTRATES

Example 69

Thermoplastic polyarylene polyether, prepared according to Example 1 and having a reduced viscosity of 0.66, was dissolved in a solvent mixture comprising 60 percent toluene, 25 percent acetone, and 10 percent cyclohexanone in an amount sufficient to produce a 25 percent solution of the polymer. Twenty grams of this solution was spread over one surface of a 6″ x 6″ x ⅛″ birch plywood panel. The coated surface was then pressed against an identical uncoated panel for 10 minutes in a press having a platen temperature of 350° F. Bonding pressure was about 300 p.s.i. After cooling, a one inch wide sample was cut from the laminate of plywood-polyarylene polyether-plywood. The cut sample was then sawed half-way through to the polyarylene polyether layer and then broken by hand. Failure occurred mostly in the wood itself and in the original bonds between the plies of the plywood. This example demonstrates the excellent adhesion of polyarylene polyether to wood and further demonstrates that the bond thereto is stronger than the wood itself and stronger than commercial wood adhesives.

Example 70

A leather strip measuring 4″ x 1″ x ⅛″ was coated on one surface with the polyarylene polyether solution described in Example 36. A second uncoated strip was then pressed against the coated side of the first strip for 10 minutes at 350° F. under 100 p.s.i. After cooling, the strips were peeled apart. Failure occurred in the leather itself and a layer of leather was left adhering to the polyarylene polyether adhesive. Peel strength, measured according to ASTM D–903–49T was 7 pounds per inch.

Example 71

Example 70 was duplicated using Neolite strips in place of the leather strips. Good adhesion was obtained and a peel strength of 6 pounds per inch was measured.

Example 72

Thermoplastic polyarylene polyether sheet, prepared according to Example 1 having a reduced viscosity of 0.50, ¹⁄₁₆″ thick was cut into strips 4″ x 1″. The strips were impinged with mineral spirits to clean them. The polymer strips were solvent bonded by dipping a metal panel into methylene chloride, removing it from the solvent, quickly pressing the end of a polymer strip against the panel for several seconds, and then pressing it against the end of a second strip of polymer in a ⅜″ overlap. A first laminate was pressed under 10 p.s.i. overnight at room temperature and allowed to dry for 2 days. A second laminate was pressed under 70 p.s.i. overnight at room temperature. In testing for lap shear strength, the first laminate failed in the polymer strip at 1440 p.s.i., and the second in the same way at 1120 p.s.i. The bonds of both laminates remained intact. This example demonstrates the ability of polyarylene polyether to adhere by solvent activation into a bond stronger than the adherend.

Example 73

A 5 percent solution of polyarylene polyether, prepared according to Example 1 having a reduced viscosity of 0.66, in methylene chloride solvent was prepared. A one inch wide strip of Kraft paper was impregnated with the 5 percent polymer solution and then pressed against a one-inch wide strip of 1/16" thick polyarylene polyether sheet, prepared according to Example 1 having a reduced viscosity of 0.50, primed with a thin layer of methylene chloride transferred to the strip by means of a metal panel. The impregnated paper and polymer adhered and were dried at room temperature. In peeling the two apart, failure occurred completely in the paper.

Example 74

Example 73 was duplicated using in place of the paper, impregnated canvas duck. The laminate was allowed to dry for two days and exhibited a peel strength of 11–12 pounds per inch.

Example 75

Studs of tungsten carbide in the form of cylindrical pins ¼ inch in diameter and ½ inch long are sheathed in thermoplastic polyarylene polyether prepared according to Example 1 and having a thickness of about 10 mils. The polyarylene polyether sheaths are applied to the studs at elevated temperatures to insure good adhesion of the polymer thereto. The sheathed studs are then imbedded in premolded holes in a tire tread. When torque is applied to the studded tire by breaking, accelerating or turning, the studs grip the road surface like a cat's claws which makes these tires especially suitable for use under winter driving conditions. The studded tires possess many of the advantages of tire chains but avoid disadvantages and nuisance of chains. The sheath of thermoplastic polyarylene polyether protects the studs against heat generated by the tire. Because the particular polyarylene polyether used has a high heat distortion temperature (350° F.) it withstands normal driving conditions whereas prior thermoplastics do not.

We claim:

1. A structural element comprising an adherend and adhering thereto a thermoplastic polyarylene polyether composed of recurring units having the formula:

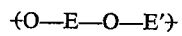

wherein E is the residuum of a dihydric phenol and E′ is the residuum of a benzenoid compound having an inert electron withdrawing group in at least one of the positions ortho and para to the valence bonds, and where both of said residua are valently bonded to the ether oxygens through aromatic carbon atoms.

2. A structural element comprising an adherend and adhering thereto a thermoplastic polyarylene polyether composed of recurring units having the formula

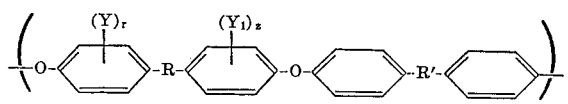

wherein R represents a member of the group consisting of a bond between aromatic carbon atoms, and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value of from 0 to 4 inclusive.

3. A strucural element comprising an adherend and adhering thereto a thermoplastic polyarylene polyether composed of recurring units having the formula

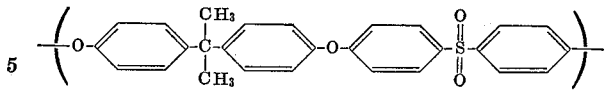

4. A structural element comprising an adherend and adhering thereto a thermoplastic polyarylene polyether composed of recurring units having the formula

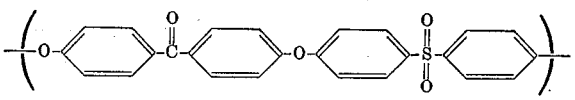

5. A structural element comprising an adherend and adhering thereto a thermoplastic polyarylene polyether composed of recurring units having the formula

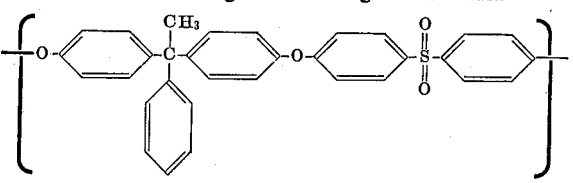

6. A structural element comprising an adherend and adhering thereto a thermoplastic polyarylene polyether composed of recurring units having the formula

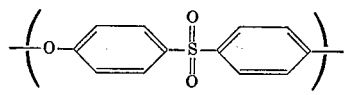

7. The structural element of claim 1 wherein said adherend is a metal.
8. The structural element of claim 1 wherein said adherend is a vitreous material.
9. The structural element of claim 1 wherein said adherend is a polar material.
10. The structural element of claim 1 wherein said adherend is a polymeric material.
11. The structural element of claim 1 wherein said adherend is a cellulosic material.
12. The structural element of claim 1 wherein said adherend is a fibrous material.
13. Method for making structural elements which includes the step of contacting the surface of an adherend with a thermoplastic polyarylene polyether composed of recurring units having the formula

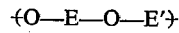

wherein E is the residuum of a dihydric phenol and E′ is the residuum of a benzenoid compound having an inert electron withdrawing group in at least one of the positions ortho and para to the valence bonds, and where both of said residua are valently bonded to the ether oxygens through aromatic carbon atoms, under conditions conducive to flow said polyarylene polyether over said surface.

14. Method for making structural elements which includes the step of contacting the surface of an adherend with a thermoplastic polyarylene polyether composed of recurring units having the formula

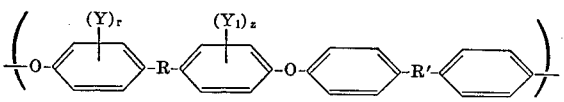

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the groups consisting of halogen, alkyl groups having from 1 to 4 carbon atoms and alkoxy groups having from 1 to 4 carbon atoms and where r and z are integers having a value from 0 to 4 inclusive, under conditions conducive to flow said polyarylene polyether over said surface.

15. The method of claim 13 wherein said polyarylene polyether is composed of recurring units having the formula

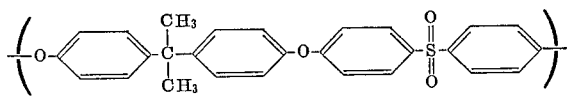

16. The method of claim 13 wherein said polyarylene polyether is composed of recurring units having the formula

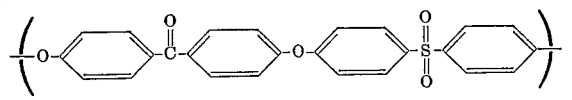

17. The method of claim 13 wherein said polyarylene polyether is composed of recurring units having the formula

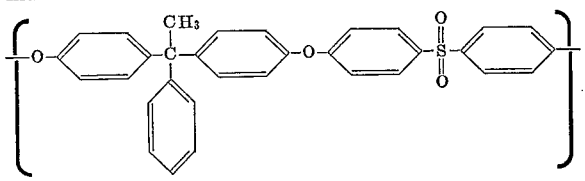

18. The method of claim 13 wherein said polyarylene polyether is composed of recurring units having the formula

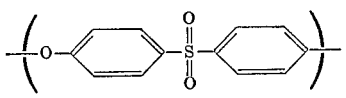

19. Method for making structural elements which includes the step of contacting the surface of an adherend with a solution of a thermoplasic polyarylene polyether composed of recurring units having the formula

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms, and drying said solution.

20. Method for making structural elements which includes the step of contacting the surface of an adherend with a thermoplastic polyarylene polyether composed of recurring units having the formula

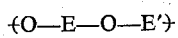

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms under conditions of heat and pressure sufficient to flux said polyarylene polyether.

References Cited

UNITED STATES PATENTS

| | | | |
|---|---|---|---|
| 3,177,089 | 4/1965 | Marshall et al. | 117—72 |
| 3,177,090 | 4/1965 | Bayes et al. | 117—72 |
| 3,221,080 | 11/1965 | Fox. | |
| 3,238,087 | 3/1966 | Norwalk et al. | |
| 3,264,536 | 8/1966 | Robinson et al. | 260—47 X |
| 3,305,528 | 2/1967 | Wynstra et al. | |
| 3,308,204 | 3/1967 | Bugel | 260—47 X |

WILLIAM D. MARTIN, *Primary Examiner.*

R. HUSACK, *Assistant Examiner.*

U.S. Cl. X.R.

117—132, 138.8, 140, 142, 143, 148, 161; 161—192, 213; 260—47, 49

Disclaimer 3,446,654.—*Bruce P. Barth*, Bound Brook, and *Edward G. Hendricks*, Belle Mead, N.J. STRUCTURAL ELEMENTS COMPRISING ADHERENT THERMOPLASTIC POLYARYLENE POLYETHER AND AN ADHEREND AND METHOD FOR MAKING THE SAME. Patent dated May 27, 1969. Disclaimer filed Oct. 26, 1971, by the assignee, *Union Carbide Corporation*.

Hereby enters this disclaimer to claims 6 and 18 of said patent.

[*Official Gazette November 14, 1972.*]